Patented June 28, 1949

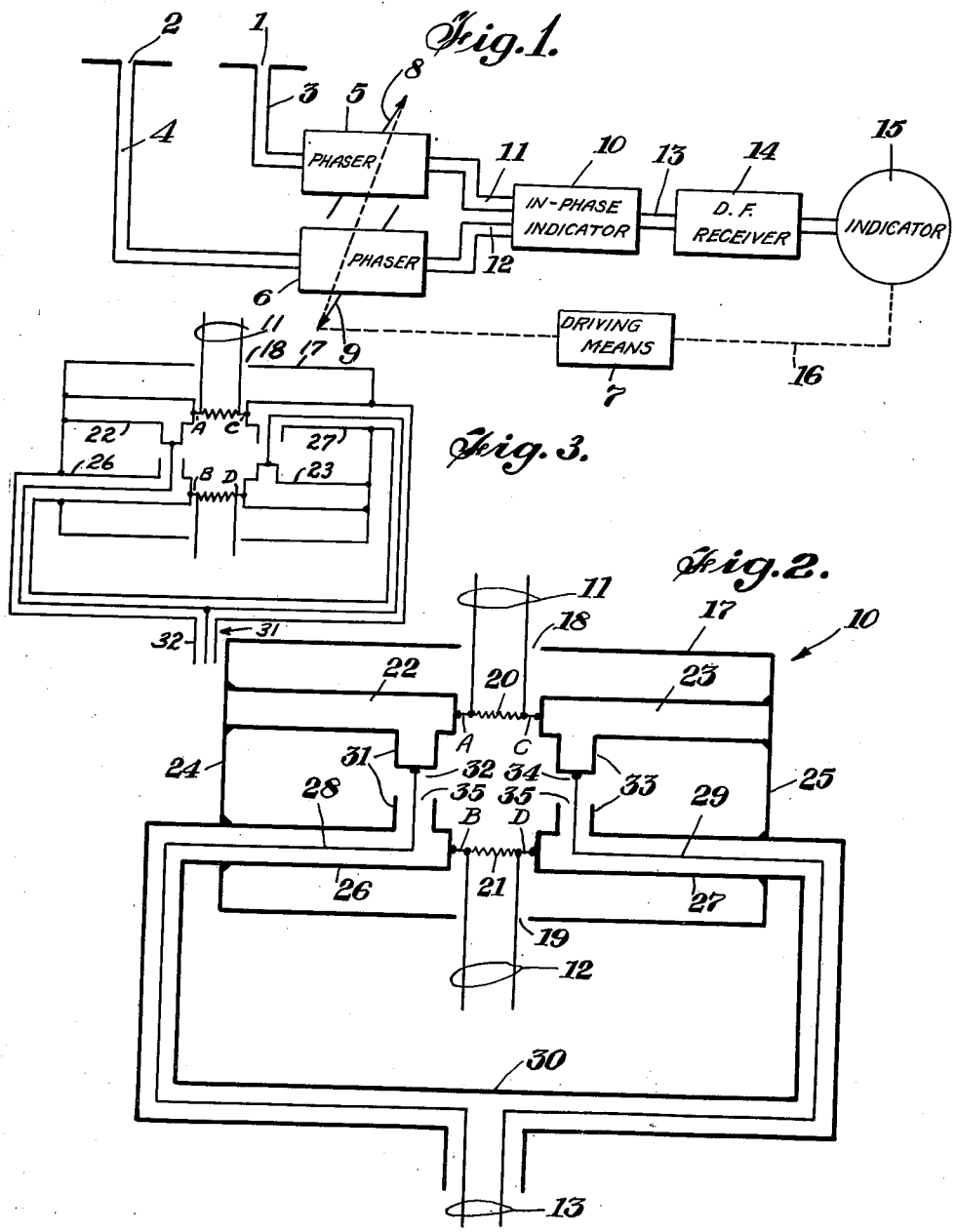

2,474,268

UNITED STATES PATENT OFFICE 2,474,268

RADIO-FREQUENCY IN-PHASE INDICATOR

Nathan Marchand, New York, N. Y., assignor to Federal Telephone and Radio Corporation, New York, N. Y., a corporation of Delaware Application July 3, 1945, Serial No. 602,951

9 Claims. (Cl. 172—245)

The present invention relates to in-phase indicators, particularly of the type adapted for phase comparison systems such as, for example, phase comparison direction finding systems of the null type.

In certain phase comparison direction finders of the null type, the phase of energy from two separate antennas is differently varied with relation to a direction finding receiver until the output derived from the antennas is equal and in phase. The relative amount of phase shift required to produce an equal in-phase output from the antennas serves to indicate the direction from which the signal is being received. To determine when the output derived from said antennas is in phase, certain devices which have been called "null detectors," but which may be termed "in-phase indicators," are employed. In the patent to M. Fuchs (7), for "Phase comparison systems," No. 2,407,659, and in my joint copending application N. Marchand-M. Semel (12-1), for "Phase comparison systems," Serial No. 578,741, filed February 19, 1945, such in-phase indicators, and direction finding systems employing them, are described. Such indicators offer high impedance to equal in-phase voltages, while they offer substantially less impedance to out-of-phase voltages. In the aforementioned copending applications, in-phase indicators are described which are adapted to compare energy from a pair of coaxial lines.

An object of the present invention is the provision of an in-phase indicator adapted to compare energy carried by a pair of balanced lines.

Other and further objects of the present invention will become apparent and the invention will be best understood from the following description of an embodiment thereof, reference being had to the drawings, in which:

Fig. 1 is a block diagram of a direction finder in which the in-phase indicator of my invention may be employed; and Fig. 2 is a schematic diagram of an in-phase indicator embodying my invention.

Fig. 3 is a schematic diagram of another form of an in-phase indicator embodying my invention.

Referring now to Fig. 1, energy from a pair of antenna units 1 and 2 is respectively coupled through lines 3 and 4 to phasers 5 and 6. Phasers 5 and 6 shift the phase of the energy passing therethrough in an amount depending upon the instant setting of each of the phasers. The phasers 5 and 6 may be continuously varied, as for example, by a driving means 7 and the position of the arrows 8 and 9 are employed to indicate that the phasers are inversely varied. Depending upon the direction from which energy is being received by the antenna units 1 and 2, there will be a precise setting of phasers 5 and 6 at which the output of said phasers will be equal and in phase. These phasers may be of any suitable type and in place of two separate phasers 5 and 6, a combined phaser of the type described in my aforementioned copending application may be employed. Other types of phasers that may be employed are those in which artificial lines are scanned by coupling to continuously shifting points thereon, as, for example, the type described in my copending application, N. Marchand (7), for "Shiftable direction antennas," Serial No. 553,562, filed September 11, 1944.

To determine when the output of phasers 5 and 6 is equal and in phase, an in-phase indicator 10 is employed, the output of phaser 5 being coupled to the in-phase indicator 10 by dual or balanced transmission line 11 and a similar line 12 is used for coupling the output of phaser 6 to the in-phase indicator 10. The output of the in-phase indicator 10 is then applied over line 13 to a direction finding receiver 14 having at its output an indicator 15 which may be a cathode ray oscillograph tube. The driving means 7 may also be used to control the trace of the cathode ray oscillograph tube or indicator 15 as indicated by the broken line 16, and the trace may be a circular trace.

In the operation of the aforedescribed system when a signal is coming in from any given direction there will be a specific position of the phasers 5 and 6 at which equal and in-phase voltages will be delivered to the in-phase indicator 10. The in-phase indicator 10 indicates that these voltages are in phase by delivering no output or a minimum to its line 13. The direction finding receiver upon receiving no input energy, will operate the indicator to produce a deflection showing that no energy is being received. At this precise time, the trace is in a certain position and the deflection of the trace at this position will indicate from what direction the signal is being received when the indicator has been properly calibrated.

Referring now to Fig. 2, the in-phase indicator 10 includes a shield 17 which may be square or rectangular having oppositely-disposed, central openings 18 and 19 through which lines 11 and 12 enter on opposite sides thereof, lines 11 and 12 being terminated within said shield in impedance-matching resistances 20 and 21 respectively. The opposite ends of resistance 20 are connected to the inner ends of conductive stubs 22 and 23 respectively which terminate at their outer ends in the end walls 24 and 25 respectively of the shield 17. Likewise the opposite ends of resistance 21 are connected to the inner ends of conductive members 26 and 27 respectively, conductive members 26 and 27 being in the form of coaxial lines and having inner conductors 28 and 29 respectively, said coaxial lines 26 and 27 passing out of the shield 17 through openings in walls 24 and 25 and coming together at 30 to form the dual transmission line 13 which is connected to the direction finding receiver as indicated in Fig. 1. The outer conductors of coaxial lines 26 and 27 make contact with the end walls 24 and 25 so that it will be seen that stub 22 and the portion of the outer conductor of coaxial line 26 within the shield 17 form a shorted transmission line section while stub 23 and the corresponding portion of coaxial line 27 within the shield 17 form another shorted transmission line section, the end walls 24 and 25 serving as the shorts for each of said sections. The electrical length of each of said sections is substantially a quarter of a wave-length at the mean frequency at which said device is designed to operate. Furthermore each section is designed to have a high surge impedance.

The stubs 22 and 23 may be solid or may be hollow having a continuous surface. Toward the inner ends thereof, stub 22 and coaxial line 26 have portions 31 projecting toward each other leaving a relatively narrow gap 32 in between. Stub 23 and coaxial line 27 likewise have similar portions 33 with a gap 34 in between. The capacity across each gap is preferably kept to a minimum value. The inner end of inner conductor 28 of coaxial line 26 extends through a side opening 35 in the outer conductor of said coaxial line across said gap and makes connection with the portion 31 of stub 22 adjacent said gap. Similarly the inner end of inner conductor 29 crosses gap 34 and is connected to the portion 33 of stub 23 adjacent said gap.

Considering the corresponding points A and B on resistances 20 and 21 respectively, and the other corresponding points C and D on the same resistances, it will be seen that when the voltages applied to said resistances are equal and in phase, the voltages at A and B will be of the same sign and equal and the voltages at C and D will be of the same sign and equal. When at a given instant A and B are equally positive, there is no potential difference across the gap 32. At the same time C and D are equally negative so there is no potential difference across the gap 34. Thus resistors 20 and 21 are not shunted with any impedance. Consequently no current will flow through the inside of coaxial lines 26 and 27 to dual transmission line 13. However when A and B have different voltages, the difference between C and D is also the same so that across gaps 32 and 34, balanced voltages appear. These are taken out through the inside of coaxial lines 26 and 27 to the dual line 13.

Because of the relatively high impedances of the shorted transmission line sections formed by the stub 22 and the associated portion of coaxial line 26, and the stub 23 with the associated portion of the coaxial line 27, and because these sections are substantially quarter wavelength shorted sections at the mean operating frequency, only a relatively small amount of energy will be dissipated in said sections.

In the foregoing description, an in-phase indicator has been described which is adapted to compare energy from two balanced sources and to deliver an output over a dual balanced line. It will of course be apparent to those versed in the art that various changes may be made in the details of such indicator without departing from the teachings of my invention. One modification is to have the inputs to the in-phase indicator in the form of dual transmission lines and the output in the form of a coaxial line. This may be accomplished by reversing the position of one of the stubs in relation to the coaxial line. That is, in Fig. 3, like components having the same reference numerals as in Fig. 2, coaxial line 27 may be connected to the point C of resistance 29 while stub 23 is connected to point D of resistance 21. The inner conductors of the two coaxial lines 27 and 26 are then connected together outside the shield 17 and to the inner conductor of a coaxial line 31, thus replacing the dual conductors of the dual transmission line 13 (Fig. 2). The outer conductor 31 of said last-mentioned coaxial line would be formed, as indicated in Fig. 3, from the outer conductors of both the coaxial lines 26 and 27. In the modification thus described, the indicator would likewise produce substantially no output when the applied voltages were equal and in-phase, and would produce a substantial output when this condition was deviated from. Other modifications will occur to those versed in the art. Accordingly, while I have described the principles of my invention in connection with specific apparatus, it is to be clearly understood that this description is made only by way of example and not as a limitation on the scope of my invention as defined in the accompanying claims.

I claim:

1. An in-phase indicator for producing a substantially zero output when the voltages applied thereto from two sources are equal and in phase, and a substantial output when said voltages differ from said relationship comprising a pair of dual transmission lines coupling said sources to said indicator, a pair of impedance-matching resistances each terminating one of said lines, a pair of shorted dual transmission line sections each substantially electrically a quarter wavelength long at the mean operating frequency and each comprising two conductors, the two conductors of one section being connected at their free ends to separate ones of corresponding points of the resistances, the two conductors of the other section being connected at their free ends to separate ones of corresponding other points of the resistances, one conductor of each section being in the form of a coaxial line having an inner conductor connected at one end thereof to the other conductor of the same section, means merging the other ends of said coaxial line conductors into a transmission output line indicating means coupled to said output line.

2. An in-phase indicator according to claim 1, wherein the two conductors of one section have their free ends connected to separate ones of the corresponding ends of the resistances, the two conductors of the other section having their free ends connected to separate ones of the other ends of said resistances.

3. An in-phase indicator according to claim 1, wherein the two conductors of each section project toward each other adjacent the free ends thereof to leave a relatively narrow gap between, with the inner conductor of each coaxial line conductor crossing its gap and being connected with the other conductor of the same section, the outer conductor of each coaxial line being connected to said separate ones of corresponding other points of said resistances.

4. An in-phase indicator according to claim 1, wherein the two coaxial line conductors have their outer conductors connected to different points on the same resistance, and the other conductors forming part of each section are connected to different points on the other resistance.

5. An in-phase indicator according to claim 1 further including a metallic shield surrounding said resistances and transmission line sections, wherein the walls of said shield serve to short each of said transmission line sections at one end thereof.

6. An in-phase indicator according to claim 1, wherein said transmission output line is a shielded dual transmission line with each of its conductors separately connected to one of the inner conductors of said coaxial line conductors and the shield of said shielded dual line is continuous with the outer conductors of said coaxial line conductors.

7. A phase comparison system for comparing two electrical signals varying in phase comprising separate transmission lines, impedance means terminating each of said transmission lines, two transmission lines resonant at the system mean operating frequency coupled respectively between and to separate points on said impedance means, and output non-radiating transmission line means coupled to high impedance points at the system mean operating frequency of said resonant transmission lines, and translating means coupled to said output transmission line means.

8. A phase comparison system for comparing two electrical signals varying in phase comprising separate balanced transmission lines for transmitting each signal, each of said transmission lines terminated in an impedance matching resistance, two quarter-wave matching stubs resonant at the system mean operating frequency coupled between and to separate points of said resistances, each of said matching stubs comprising two members short circuited a quarter wavelength from its coupling to said resistance, one of said members of each of said stubs comprising a coaxial transmission line having an inner conductor coupled to the corresponding other member of each of said stubs substantially at its point of coupling to said resistances, means connecting each of said coaxial lines substantially at their point of short circuit with their corresponding other members into a common transmission line and translating means coupled to said common transmission line.

9. A system as set forth in claim 8, wherein said common transmission line comprises a balanced dual transmission line.

NATHAN MARCHAND.

REFERENCES CITED

The following references are of record in the file of this patent:

UNITED STATES PATENTS

| Number | Name | Date |
| --- | --- | --- |
| 2,182,950 | Steinhoff | Dec. 12, 1939 |
| 2,280,461 | Whisk | Apr. 21, 1942 |
| 2,282,541 | Bernstein | May 12, 1942 |
| 2,283,676 | Kandoian | May 19, 1942 |
| 2,293,739 | Kemp | Aug. 25, 1942 |
| 2,368,694 | Watts | Feb. 6, 1945 |
| 2,407,659 | Fuchs | Sept. 17, 1946 |